(12) United States Patent
Hsia (10) Patent No.: US 10,390,396 B1
(45) Date of Patent: Aug. 20, 2019

(54) LINEAR SOLID-STATE LIGHTING WITH MULTIPLE SWITCHES (71) Applicant: Aleddra Inc., Renton, WA (US)

(72) Inventor: Chungho Hsia, Bellevue, WA (US)

(73) Assignee: ALEDDRA INC., Renton, WA (US)

(*) Notice: Subject to any disclaimer, the term of this patent is extended or adjusted under 35 U.S.C. 154(b) by 0 days.

(21) Appl. No.: 16/432,735

(22) Filed: Jun. 5, 2019

Related U.S. Application Data

(63) Continuation-in-part of application No. 16/401,849, filed on May 2, 2019, which is a continuation-in-part of application No. 16/296,864, filed on Mar. 8, 2019, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, (Continued)

(51) Int. Cl.
H05B 33/08 (2006.01)

(52) U.S. Cl.
CPC ....... *H05B 33/0815* (2013.01); *H05B 33/089* (2013.01)

(58) Field of Classification Search
None
See application file for complete search history.

(56) References Cited

U.S. PATENT DOCUMENTS 9,686,835 B2 * 6/2017 Park ............... H05B 33/0806
2014/0265900 A1 * 9/2014 Sadwick .......... H05B 33/0803
                                                              315/200 R

(Continued)

*Primary Examiner* — Minh D A
*Assistant Examiner* — James H Cho
(74) *Attorney, Agent, or Firm* — Han IP PLLC; Andy M. Han (57) ABSTRACT

A linear light-emitting diode (LED) lamp (LL lamp) comprising a front-end module, an LED driving circuit operable with a ballast and alternate current (AC) mains, an anti-electric-shock module, and a switch control module operates with the AC mains in a single end and double ends and with the ballast in the double ends without any risk of electric shock. Besides, the LL lamp passes an industry required electric shock test when an input AC voltage from a testing ballast is applied in the double ends. Whereas both the front-end module and the switch control module are coupled to a first ground reference, the LED driving circuit is coupled to a second ground reference. When the input AC voltage from the ballast is applied, the switch control module is enabled to couple the second ground reference to the first ground reference, allowing a current returned to operate the LL lamp.

11 Claims, 6 Drawing Sheets

Related U.S. Application Data now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

2014/0300274 A1* 10/2014 Acatrinei ........... H05B 33/0815
                                                               315/85
2017/0311396 A1* 10/2017 Sadwick ................. F21V 25/00

* cited by examiner

LINEAR SOLID-STATE LIGHTING WITH MULTIPLE SWITCHES

CROSS-REFERENCE TO RELATED APPLICATIONS

The present disclosure is part of a continuation-in-part (CIP) application of U.S. patent application Ser. No. 16/401, 849, filed 2 May 2019, which is part of CIP application of U.S. patent application Ser. No. 16/296,864, filed 8 Mar. 2019, which is part of CIP application of U.S. patent application Ser. No. 16/269,510, filed 6 Feb. 2019, which is part of CIP application of U.S. patent application Ser. No. 16/247,456, filed 14 Jan. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps that integrally equip with multiple switches and work with conventional fluorescent lamp fixtures configured to electrically connect either ballasts in double ends or alternating current (AC) mains in the double ends and a single end without electric shock hazards.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of a linear LED lamp (LL lamp, hereinafter) to replace an existing fluorescent lamp, consumers may choose either to adopt a ballast-compatible LL lamp with an existing ballast used to operate the fluorescent lamp or to employ an AC mains-operable LL lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LL lamps work only with particular types of ballasts. If the existing ballast is not compatible with the ballast-compatible LL lamp, the consumer will have to replace the ballast. Some facilities built long time ago incorporate different types of fixtures, which requires extensive labor for both identifying ballasts and replacing incompatible ones. Moreover, a ballast-compatible LL lamp can operate longer than the ballast. When an old ballast fails, a new ballast will be needed to replace in order to keep the ballast-compatible LL lamps working. Maintenance will be complicated, sometimes for the lamps and sometimes for the ballasts. The incurred cost will preponderate over the initial cost savings by changeover to the ballast-compatible LL lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LL lamps are dead or not installed. In this sense, any energy saved while using the ballast-compatible LL lamps becomes meaningless with the constant energy use by the ballast. In the long run, the ballast-compatible LL lamps are more expensive and less efficient than self-sustaining AC mains-operable LL lamps.

On the contrary, an AC mains-operable LL lamp does not require a ballast to operate. Before use of the AC mains-operable LL lamp, the ballast in a fixture must be removed or bypassed. Removing or bypassing the ballast does not require an electrician and can be replaced by end users. Each AC mains-operable LL lamp is self-sustaining. Once installed, the AC mains-operable LL lamps will only need to be replaced after 50,000 hours. In view of above advantages and disadvantages of both the ballast-compatible LL lamps and the AC mains-operable LL lamps, it seems that market needs a most cost-effective solution by using a universal LL lamp that can be used with the AC mains and is compatible with a ballast so that LL lamp users can save an initial cost by changeover to such an LL lamp followed by retrofitting the lamp fixture to be used with the AC mains when the ballast dies.

Ballasts have several different types. However, in the US, electronic ballasts are most popular in lamp fixtures because they are more efficient and less expensive than other types of ballasts. Nevertheless, it is better for the ballast-compatible LL lamp to be compatible with either electronic ballasts or other types of ballasts.

As mentioned above, a cost-effective solution may be to use a ballast as part of an LED driver to operate a lamp. In some prior art schemes, a switching mode power supply (SMPS) type LED driver is proposed to use with a ballast but has not been completely accepted due to occasional fires that arise inside the ballast. The cause of these fires has been identified to be a large dc input capacitor in the SMPS type LED driver, which may destroy a capacitor in the ballast due to excessive initial resonant voltage. A conventional SMPS type LED driver for the AC mains comprises a Buck converter, which can efficiently convert input voltages of 110~277 VAC into a direct current (DC) voltage required to power LEDs in an LL lamp. However, the ballast has an AC output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an overvoltage protection (OVP) function in the control logic starts at a low voltage limited by the low operating voltage. When an input voltage from a ballast exceeds a certain value, OVP functions to stop operation, shutting down the lamp. Third, the Buck converter operates in a continuous conduction mode, in which an input current fails to follow the input voltage, leading to a low power factor with the AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to the switch, and the Buck converter stops to function until the input voltage level recovers, resulting in flickering. For an LL lamp operating solely with a ballast, the power and current control is basically via an impedance or output voltage control. In the former case, when input frequency changes, the impedance changes, altering an AC current to flow into the driving circuit. A ballast is, in practice, supposed to operate two or more lamps, and its output frequency of the ballast decreases as a load increases, meaning that the total power consumption does not linearly increase as the number of lamps used increases. In the worst case, the LL lamp that is designed for a group of three or four lamps in a fixture powered by a ballast may be burned out due to over-rated current flowing into the one or more LED arrays in the lamp if only one of such a lamp is installed in the fixture. For the latter case, the output voltage control approach may work with an electronic ballast but cannot be used in the AC mains. In general, conventional LED drivers fail to work with a ballast and to properly operate the LL lamp at a regulated power, resulting in unstable lighting output. It goes without saying that the same LED drivers can flawlessly operate the LL lamp with the AC mains.

Conventional fluorescent lamp fixtures receive a ballast output voltage from both ends, so called double-ended configuration. When such fixtures are retrofitted double-ended to operate LL lamps with the AC mains, a leakage current can flow out of the exposed bi-pin, resulting in an electric shock hazard to an installer. Thus, Underwriters Laboratories (UL) require that double shock protection switches be used in the LL lamps wired in the double-ended configuration using the AC mains as a power source. However, if the AC mains supply from a single end, i.e. a bi-pin in one end (say, the first end) of the LL lamp, with the other end (the second end) electrically isolated from the first end, then the electric shock hazard can be eliminated. In addition to the single end for AC mains operation, when double ends are also needed for operating both the ballast and the AC mains, both the first end and the second end are electrically connected to the ballast and the AC mains. How can the LL lamps electrically connect to the AC mains in the single end and in the double ends and to ballasts in the double ends all without electric shock hazards and pass an industry required electric shock test when an input AC voltage from a testing ballast is applied in the double ends? In this patent disclosure, a novel approach will be well addressed.

SUMMARY

The present disclosure aims to provide a novel approach that can be adopted to operate an LL lamp with the AC mains in a single-ended and a double-ended manner and to work with a ballast configured in a double-ended manner. No electric shock is possible to occur for all the above configurations during initial installation and re-lamping. The LL lamp may include a housing having a front end and a rear end; one or more LED arrays with a forward voltage across thereon; a first bi-pin and a second bi-pin respectively connected to the front end and the rear end, protruding outwards to receive an input alternating current (AC) voltage; an anti-electric-shock module; at least one switch control module; a front-end module and a rear-end module; and a ballast compatible and AC operable LED driving circuit (LED driving circuit, hereinafter). The front-end module comprises four front-end diodes connected as a full-wave rectifier with a first ground reference at a low DC voltage potential port of the full-wave rectifier. The front-end module is coupled to the first bi-pin. The rear-end module comprises two rear-end diodes and two voltage reduction circuits. The two rear-end diodes are coupled to the second bi-pin. The two voltage reduction circuits are respectively coupled between the first bi-pin and the second bi-pin. The four front-end diodes and the two rear-end diodes are configured to manage electric current flows and to convert the input AC voltage into a first DC voltage. The two voltage reduction circuits respectively comprise a third at least one capacitor and a fourth at least one capacitor and are configured to decrease the input AC voltage from the ballast and to reliably operate the LED driving circuit.

The LED driving circuit comprises a second ground reference, an input filter, a power factor correction (PFC) and control device, a first at least one electronic switch controlled by the PFC and control device, a current sensing resistor, a diode, a transformer with its current charging and discharging controlled by the first at least one electronic switch, a resistor, an output capacitor in parallel with the resistor connected to the transformer to build up a DC output voltage greater than the forward voltage across the one or more LED arrays to operate thereon, and an alternate power unit. In other words, the LED driving circuit is configured to convert the first DC voltage into another DC voltage greater than the forward voltage across the one or more LED arrays to operate thereon when the electric shock is not detected.

The LED driving circuit is connected in series with the anti-electric-shock module further connected to the first ground reference. When the electric shock is detected by the anti-electric-shock module, the second ground reference which LED driving circuit is connected to fails to connect to the first ground reference, thereby disconnecting a return current from the LED driving circuit to reach the AC mains, no leakage current coming out of an exposed bi-pin.

Above all, when such an LL lamp is installed in the fixture, the four front-end diodes and the two rear-end diodes can detect how the input AC voltage is applied, control electric current flows, and complete current returns from the LED driving circuit to an applicable pin on the LL lamp so that the LL lamp can operate with the existing ballast in double ends or simply with the AC mains in a single end and the double ends without operational uncertainty. The LED driving circuit is essential to make such a dual-mode operation possible. The first at least one electronic switch in the LED driving circuit must operate at a switching frequency greater than or equal to a frequency of the input AC voltage from the ballast to support switching in each AC cycle and to regulate an LED driving current when the input AC voltage is from the ballast. In the LED driving circuit, the transformer comprises a primary winding and a secondary winding in a reversed polarity of the primary winding. Whereas the primary winding is connected between the one or more LED arrays and the first at least one electronic switch, the secondary winding is connected to the second ground reference. When the first at least one electronic switch is opened, a falling magnetic field in the primary winding reverses a voltage polarity and causes a voltage across the secondary winding to be positive relative the second ground reference. The alternate power unit comprises a voltage divider, at least one diode, and a resistor connected in series with the at least one diode. The voltage divider is connected in parallel with the secondary winding. The at least one diode connected in series with the secondary winding and the voltage divider. Whereas the voltage divider is configured to sample a proportion of the voltage across the secondary winding for the PFC and control device to properly operate the LED driving circuit, the at least one diode and the resistor are configured to draw partial power from the DC output voltage to sustain an operation of the PFC and control device, subsequently operating the LED driving circuit.

The at least one switch control module is coupled between the first ground reference and the second ground reference and configured to receive an AC signal voltage from the second bi-pin and to couple the second ground reference to the first ground reference when the input AC voltage is from the ballast. In other words, when the input AC voltage is from the ballast, the LED driving circuit operates whereas the at least one switch control module provides a return current path from the LED driving circuit to reach the ballast, thereby operating the one or more LED arrays. The at least one switch control module comprises a second at least one electronic switch, two diodes connected cathode-to-anode at a connection port, and a first at least one capacitor connected to the two diodes at the connection port. The first at least one capacitor and the two diodes are configured to rectify the AC signal voltage from the ballast into a third DC voltage. The at least one switch control module further comprises a Zener diode, a resistor, and a second at least one capacitor connected in parallel with the Zener diode and the resistor. The Zener diode, the resistor, and the second at least one capacitor are configured to receive the third DC voltage, to build up a bias voltage, and to operate the second at least one electronic switch, turning "on" or "off" an electric current flowing from the second ground reference to the first ground reference.

The anti-electric-shock module comprises a controller and a third at least one electronic switch and is configured to detect an electric shock and to prevent a shock current, if occurred, from flowing into either the first bi-pin or the second bi-pin when the input AC voltage is a line voltage from the AC mains. The third at least one electronic switch is connected between the first ground reference and the second ground reference and is configured to control an electric current flowing from the second ground reference to the first ground reference when the controller does not detect any electric shock current occurred.

The LL lamp is used to replace a fluorescent lamp in a retrofit or newly-made lamp fixture that could have an existing ballast operated in a double-ended manner or an AC mains-ready single-ended and double-ended configuration. In a word, when the LL lamp is installed in the fixture, the front-end module and a rear-end module can detect how the input AC voltage is applied, control electric current flows, and complete current returned from the LED driving circuit to an applicable bi-pin on the LL lamp so that the LL lamp can operate with the existing ballast in the double ends or with the AC mains in the single end and the double ends without operational uncertainty and electric shock hazards. Furthermore, when used to test the electric shock current appeared at the first bi-pin or the second bi-pin, the input AC voltage from a low-frequency reference ballast is electrically coupled to two of the four front-end diodes and the two rear-end diodes with a return current prevented from flowing through the at least one switch control module, but instead, allowed flowing in the anti-electric-shock module to be blocked when electric shock current is detected, thereby passing such an industry required electric shock test.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
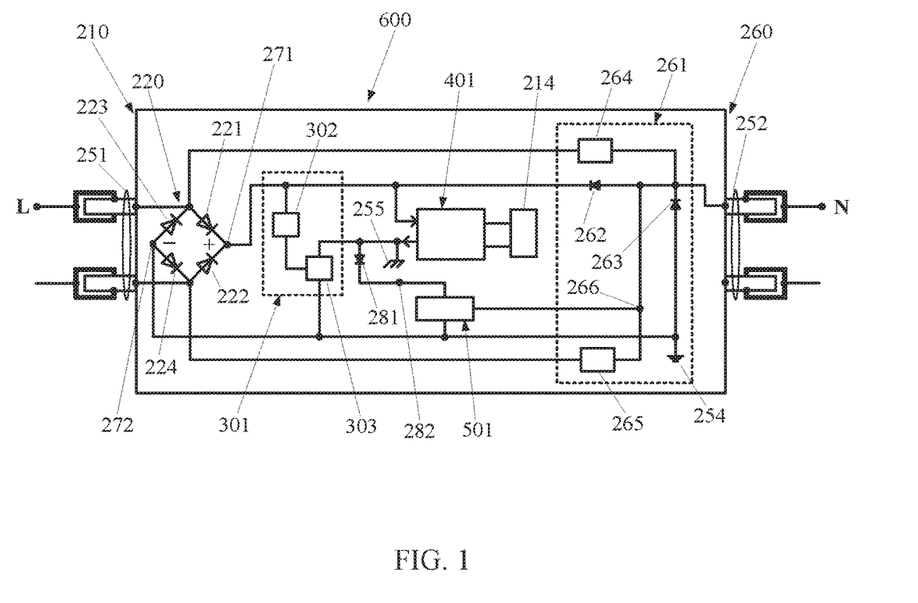
FIG. 1 is a block diagram of a linear LED lamp operable with the AC mains in the double ends according to the present disclosure.

FIG. 1 is a block diagram of a linear LED lamp operable with the AC mains in the double ends according to the present disclosure. The LL lamp 600 comprises a housing having a front end 210 and a rear end 260; one or more LED arrays 214 with a forward voltage across thereon; a first bi-pin 251 and a second bi-pin 252 respectively coupled to the front end 210 and the rear end 260, protruding outwards to receive an input AC voltage; an anti-electric-shock module 301; at least one switch control module 501; a front-end module 220 and a rear-end module 261; and an LED driving circuit 401. The front-end module 220 comprises four front-end diodes 221, 222, 223, and 224 connected as a full-wave rectifier with a high DC voltage potential port 271 and a low DC voltage potential port 272. The low DC voltage potential port 272 is connected to a first ground reference 254, also denoted as "-" in the full-wave rectifier. The front-end module 220 is coupled to the first bi-pin 251 and the first ground reference 254. The rear-end module 261 comprises two rear-end diodes 262 and 263 and two voltage reduction circuits 264 and 265. The two rear-end diodes 262 and 263, interconnected to the four front-end diodes 221, 222, 223, and 224 at the high DC voltage potential port 271 and the low DC voltage potential port 272, are coupled to the second bi-pin 252. The two voltage reduction circuits 264 and 265 are respectively coupled between the first bi-pin 251 and the second bi-pin 252. The four front-end diodes 221, 222, 223, and 224 and the two rear-end diodes 262 and 263 are configured to manage electric current flows and to convert the input AC voltage into a first DC voltage. In FIG. 1, the first bi-pin 251 and the second bi-pin 252 are respectively connected to the AC mains (L and N) in a double-ended wiring lamp fixture.

In FIG. 1, when the AC mains appear across the first bi-pin 251 and the second bi-pin 252, a line voltage from the AC mains applies to the front-end module 220 and the rear-end module 261. The front-end diodes 221 and 223 and the rear-end diodes 262 and 263 conduct to convert the input AC voltage into a first DC voltage with the high DC voltage potential at the port 271 relative to the low DC voltage potential at the port 272. A DC current starts at the port 271 to flow into the LED driving circuit 401, which then converts the first DC voltage into another DC voltage greater than the forward voltage across the one or more LED arrays 214 to apply thereon. As shown in FIG. 1, the LED driving circuit 401 is connected to a second ground reference 255. Although an electric current returned from the LED driving circuit 401 reaches the second ground reference 255, the one or more LED arrays 214 do not get power to light up because the second ground reference 255 is not yet connected to the first ground reference 254, thus no energy transfer taking place. In FIG. 1, the anti-electric-shock module 301 comprises a controller 302 and a third at least one electronic switch 303 and is connected to the first ground reference 254. The anti-electric-shock module 301 is configured to control an electric current flowing from the second ground reference 255 to the first ground reference 254. When no electric shock is detected, the controller 302 controls to turn "on" the third at least one electronic switch 303, which allows the electric current returned to the second ground reference 255 to find its way out via a forward-biased diode, either the rear-end diode 263 or the front-end diode 223 back to the AC mains, completing a power delivery to the one or more LED arrays 214. That is to say, the anti-electric-shock module 301 is configured to detect an electric shock and to prevent a shock current, if occurred, from flowing into either the first bi-pin 251 or the second bi-pin 252 when the input AC voltage is the line voltage from the AC mains. It is, therefore, not possible for a leakage current to flow from the second ground reference 255 to reach the first bi-pin 251 or the second bi-pin 252, creating an electric shock hazard if the anti-electric-shock module 301 is present. The electric current returned from the LED driving circuit 401, reaching the second ground reference 255, also goes to the at least one switch control module 501 via a diode 281 and a port 282. In order for the at least one switch control module 501 to function to connect the second ground reference 255 to the first ground reference 254, the at least one switch control module 501 must receive an AC signal voltage from the second bi-pin 252 via a port 266 further connected to the second bi-pin 252. The third at least one electronic switch 303 comprises a metal-oxide-semiconductor field-effect transistor (MOSFET) or a transistor.

Figure 2:
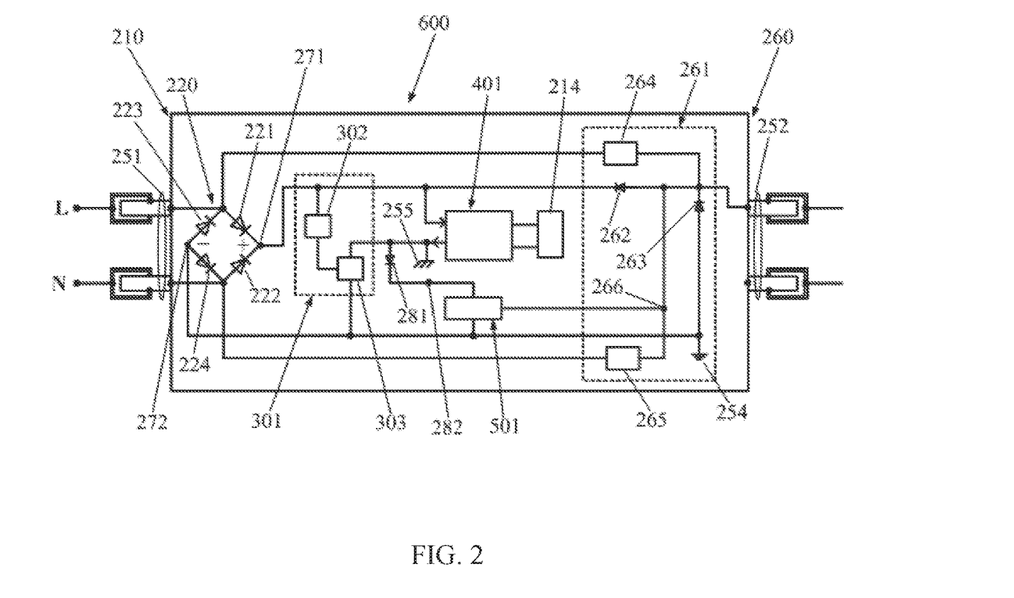
FIG. 2 is a block diagram of a linear LED lamp operable with the AC mains in the single end according to the present disclosure.

FIG. 2 is a block diagram of a linear LED lamp operable with the AC mains in the single end according to the present disclosure. In FIG. 2, all the components and configurations are the same as those in FIG. 1, except that the AC mains appear only in the first bi-pin 251. A seen in FIG. 2, the line voltage from the AC mains applies to the front-end module 220 with the rear-end module 261 not committed. The four front-end diodes 221, 222, 223, and 224 conduct to convert the input AC voltage into the first DC voltage with the high DC voltage potential at the port 271 relative to the low DC voltage potential at the port 272. The DC current starts at the port 271 to flow into the LED driving circuit 401, which then converts the first DC voltage into another DC voltage greater than the forward voltage across the one or more LED arrays 214 to apply thereon. The electric current returns to reach the second ground reference 255. The one or more LED arrays 214 do not get power to light up because the second ground reference 255 is not yet connected to the first ground reference 254, thus no energy transfer taking place. The anti-electric-shock module 301 is configured to control an electric current flowing from the second ground reference 255 to the first ground reference 254. Because no electric shock can be detected in a single end configuration, the controller 302 controls to turn "on" the third at least one electronic switch 303, which allows the electric current returned to the second ground reference 255 to find its way out via a forward-biased diode, either the front-end diode 223 or the front-end diode 224 back to the AC mains, completing a power delivery to the one or more LED arrays 214. It is, therefore, not possible for a leakage current to flow from the second ground reference 255 to reach the second bi-pin 252, creating an electric shock hazard.

Figure 3:
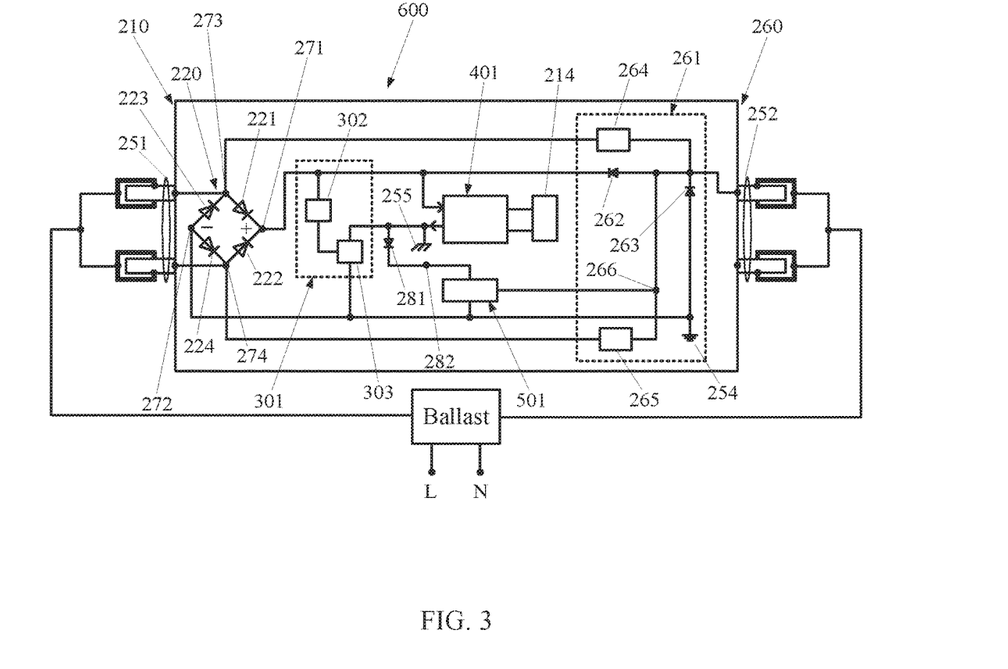
FIG. 3 is a block diagram of a linear LED lamp operable with a ballast in the double ends according to the present disclosure.

FIG. 3 is a block diagram of a linear LED lamp operable with the ballast in the double ends according to the present disclosure. In FIG. 3, all the components and configurations are the same as those in FIG. 1, except that the LL lamp 600 is connected to the ballast through the first bi-pin 251 and the second bi-pin 252 in the double-ended configuration. Each of the first bi-pin 251 and the second bi-pin 252 is individually shunted. Suppose that in a positive AC half-cycle, the first bi-pin 251 has a high AC electric potential relative to the second bi-pin 252. Whereas the high DC voltage potential appears at the port 271 relative to the low DC voltage potential at the port 272, a DC current flows into the LED driving circuit 401. When energized, the LED driving circuit 401 converts the first DC voltage rectified from an input AC voltage from the ballast into another DC voltage greater than the forward voltage across the one or more LED arrays 214 to power thereon. An electric current returned from the LED driving circuit 401 reaches the second ground reference 255 and is tested by both the at least one switch control module 501 and the anti-electric-shock module 301. Whereas the anti-electric-shock module 301 does not respond to build up a sustaining voltage to operate the third at least one electronic switch due to high frequency half waves in the first DC voltage appeared at the port 271, the at least one switch control module 501 responds to build up a sustaining voltage to operate a second at least one electronic switch 509 in the at least one switch control module 501 (depicted in FIG. 5). That is, the second at least one electronic switch 509 is turned on, guiding the electric current returned from the LED driving circuit 401 to go to the first ground reference 254, further down to the second bi-pin 252, completing the energy transfer to the one or more LED arrays 214 in the positive half cycle. Similarly, in a negative half-cycle, the second bi-pin 252 has a high AC electric potential. An electric current flows from the rear-end diode 262 in the rear-end module 261 to the port 271. The electric current cannot pass through the four front-end diodes 221, 222, 223, and 224 because the diodes 221 and 222 block its way due to reversed biases. Whereas the high DC voltage potential appears at the port 271 relative to the low DC voltage potential at the port 272, a DC current flows into the LED driving circuit 401. When the LED driving circuit 401 is powered up, the DC output voltage is built up to power the one or more LED arrays 214. An electric current returned from the LED driving circuit 401 reaches the second ground reference 255 and is tested by both the at least one switch control module 501 and the anti-electric-shock module 301. Whereas the anti-electric-shock module 301 does not respond to build up a sustaining voltage to operate the third at least one electronic switch due to the high frequency half waves in the first DC voltage appeared at the port 271, the at least one switch control module 501 responds to build up a sustaining voltage to operate the second at least one electronic switch 509 (FIG. 5) in the at least one switch control module 501 (depicted in FIG. 5). That is, the second at least one electronic switch 509 is turned on, guiding the electric current returned from the LED driving circuit 401 to go to the first ground reference 254, further down to the second bi-pin 252, completing the energy transfer to the one or more LED arrays 214 in the negative half cycle.

Figure 4:
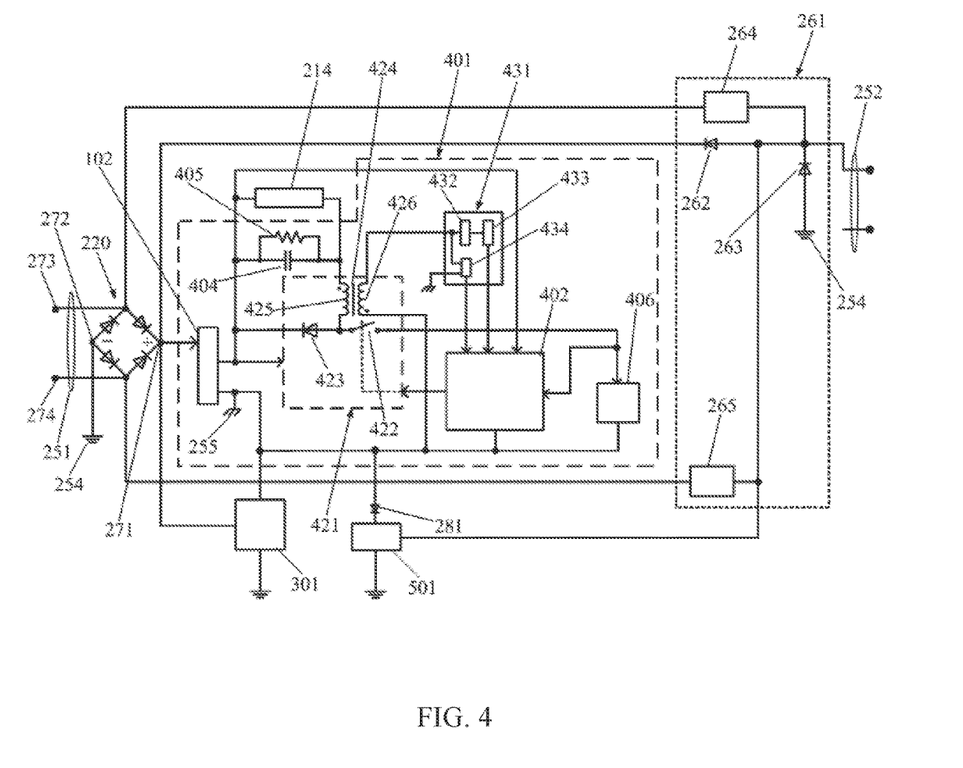
FIG. 4 is a block diagram of an LED driving circuit used in a linear LED lamp operable with either a ballast in the double ends or the AC mains in the single end and the double ends according to the present disclosure.

FIG. 4 is a block diagram of an LED driving circuit used in the linear LED lamp operable with either a ballast in the double ends or the AC mains in the single end and the double ends according to the present disclosure. In FIG. 4, the driving circuit 401 connects to the ports 271 and 272 and is interconnected between the front-end module 220 (i.e. the four front-end diodes 221, 222, 223, and 224) and the rear-end module 261 (i.e. the two rear-end diodes 262 and 263) with the AC mains applied to the ports 273 and 274. When the input AC voltage is applied to the both ends of the LL lamp for a ballast application, an electrical connection between the ports 271 and 272 in the front end and the rear-end bi-pin 252 must be made in a way that the high DC voltage potential appears at the port 271 with the low DC voltage potential appeared at the port 272. The LED driving circuit 401 comprises an input filter 102 used to filter an input voltage from the ports 271 and 272 and to suppress an electromagnetic interference (EMI) noise created in the driving circuit 401, a power factor correction (PFC) and control device 402, a Buck converter 421 in communicating with the PFC and control device 402, an output capacitor 404 in parallel with a resistor 405 connected to the Buck converter 421 to build up a DC output voltage greater than the forward voltage across the one or more LED arrays 214 and to power thereon, a current sensing resistor 406, and an alternate power unit 431 configured to extract partial energy from the DC output voltage to sustain the PFC and control device 402. A high DC voltage potential at the port 271 is connected to a high side of the input filter 102 with a low side of the input filter 102 connected to a second ground reference 255. The Buck converter 421 comprises a first at least one electronic switch 422 controlled by the PFC and control device 402, a diode 423, and a transformer 424. The transformer 424 comprises a primary winding 425 and a secondary winding 426 with the primary winding 425 charged and discharged controlled by the first at least one electronic switch 422. The PFC and control device 402 detects zero current in the primary winding 425 within an AC cycle of the input AC voltage and generate control signals to control the first at least one electronic switch 422 "on" and "off" with a constant on-time and a varied off-time. By adapting switching frequencies for a high frequency associated with the ballast and a low frequency associated with the AC mains, the PFC and control device 402 controls the first at least one electronic switch 422 "on" and "off" in a way that the primary winding 425 is charged during on-time and discharged during off-time until a desired DC output voltage V, across the one or more LED arrays 214 is reached to light up the one or more LED arrays 214. An average current in the primary winding 425 is thus equal to the output current that flows into the one or more LED array 214. When the first at least one electronic switch 422 is "on", the diode 423 is reverse-biased, and an input current flows from the input filter 102, the first at least one electronic switch 422, and the current sensing resistor 406, into the primary winding 425. When the current flowing into the primary winding 425 increases, the voltage across the current sensing resistor 406 increases. The PFC and control device 402 connecting to the current sensing resistor 406 continuously receives signals and adjusts the off-time such that the DC output voltage and current to the one or more LED arrays 214 are regulated to meet output voltage and current requirements. The output capacitor 404 in parallel with the resistor 405 connecting to the primary winding 425 thus can receive energy to build up the DC output voltage and to power the one or more LED arrays 214. In FIG. 4, the first at least one electronic switch may comprise a metal-oxide-semiconductor field-effect transistor (MOSFET) or a transistor.

In FIG. 4, the alternate power unit 431 comprises a diode 432, a resistor 433, and a voltage divider 434. The alternate power unit 431 is connected between the secondary winding 426 and the PFC and control device 402 with a high side of the secondary winding 426 connected to the diode 432 and the voltage divider 434. The diode 432 and the resistor 433 connected in series to each other are further connected to the PFC and control device 402. The voltage divider 434 is connected to the secondary winding 426 in parallel with each other, both sharing the second ground reference 255. The PFC and control device 402 has an input capacitor (not shown) used to store energy with a supplying voltage built up to supply an internal logic control circuit (not shown) in the PFC and control device 402. In FIG. 4, the secondary winding 426 is in a reversed polarity of the primary winding 425 with dots added to the primary winding 425 and the secondary winding 426 indicating the polarity of the mutually induced voltages across the primary winding 425 and the secondary winding 426. Whereas the primary winding 425 is coupled between the one or more LED arrays 214 and the first at least one electronic switch 422, the secondary winding 426 is coupled to the second ground reference 255. When the first at least one electronic switch 422 is opened, a falling magnetic field in the primary winding 425 reverses a voltage polarity and causes a voltage across the secondary winding 426 to be positive relative the second ground reference 255. Whereas the diode 432 and the resistor 433 extract partial power from the secondary winding 426 to pour energy into the input capacitor to sustain an operation of the PFC and control device 402, the voltage divider 434 samples a proportion of the voltage across the secondary winding 426 to feedback control the PFC and control device 402 for a proper LED driving current. The alternate power unit 431 continuously monitors the DC output voltage by using the secondary winding 426. When the voltage at the high side of the secondary winding 426 is higher than a becoming lower operating voltage in the PFC and control device 402 due to increased internal operations, the diode 432 in the alternate power unit 431 conducts to supply energy and to sustain the operating voltage in the PFC and control device 402.

In FIG. 4, the function of the alternate power unit 431 is essential because the LED driving circuit 401 has a wide range of operating voltages not only 110 and 277 VAC for the AC mains but also 375~550 VAC for the ballast. In the PFC and control device 402, a start-up resistor (not shown) is so designed to operate the LL lamp at the lowest input voltage 110 VAC. When the highest voltage 550 VAC from the ballast comes in, a higher proportional voltage appears at an input of the internal logic control circuit. Therefore, an operating voltage for the internal logic control circuit in the PFC and control device 402 should be in a wide range such as 11~35 VDC rather than 5~15 VDC as in a conventional logic control device. To meet requirements of start-up time and current without a "turn-on" failure or flickering occurred at the lamp start-up, the input capacitor in the PFC and control device 402 with a minimum capacitance is designed and used at the input of the internal logic control circuit. The alternate power unit 431 is thus needed to pump in energy in time and to sustain the operating voltage ensuring no flickering occurred when operating the LL lamp. In FIG. 4, the first voltage reduction circuit 264 and the second voltage reduction circuit 265 are respectively coupled between the first bi-pin 251 and the second bi-pin 252 receiving the input AC voltage. The two voltage reduction circuits may respectively comprise the third at least one capacitor (not shown) and the fourth at least one capacitor (not shown) configured to decrease the input AC voltage from the ballast and to reliably operate the LED driving circuit 401 whereas no effect is for the input AC voltage from the AC mains. In this case, a voltage restriction mentioned above on an operating voltage range may be relaxed.

In FIG. 4, when the first at least one electronic switch 422 is off, the diode 423 is forward-biased, and the primary winding 425 discharges with a loop current flowing from the one or more LED arrays 214, the diode 423, the current sensing resistor 406, back to the primary winding 425. The current sensing resistor 406 keeps track of the output current and feedbacks to the PFC and control device 402 to further control the first at least one electronic switch 422 "on" and "off". Such a closed loop operation in both on-time and off-time of the first at least one electronic switch 422 ensures the output current to be accurately controlled within 4%.

Figure 5:
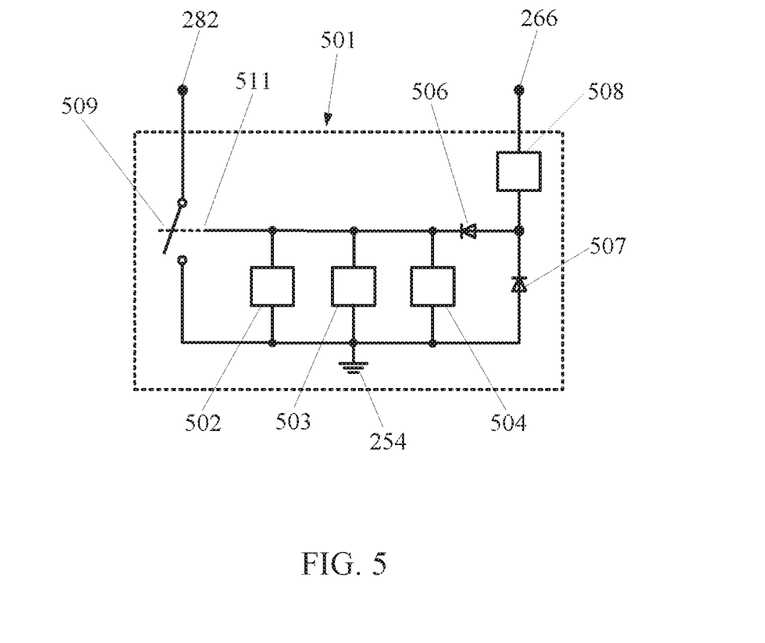
FIG. 5 is a block diagram of at least one switch control module according to the present disclosure.

FIG. 5 is a block diagram of at least one switch control module according to the present disclosure. The at least one switch control module 501 comprises the second at least one electronic switch 509, two diodes 506 and 507 connected cathode-to-anode at a connection port, and a first at least one capacitor 508 connected to the two diodes 506 and 507 at the connection port. The first at least one capacitor 508 and the two diodes 506 and 507 are configured to receive an AC signal voltage from the port 266 (FIGS. 1-3) further connected to the second bi-pin 252 and to rectify the AC signal voltage from the ballast into the third DC voltage. The second at least one electronic switch 509 is connected between the port 282 (FIGS. 1-3) and the first ground reference 254. That is, the at least one switch control module 501 is coupled between the first ground reference 254 and the second ground reference 255 via the diode 281 (FIGS. 1-3) and configured to couple the second ground reference 255 to the first ground reference 254 when the input AC voltage is from the ballast. The at least one switch control module 501 further comprises a Zener diode 502, a resistor 504, and a second at least one capacitor 503 connected in parallel with the Zener diode 502 and the resistor 504. The Zener diode 502, the resistor 504, and the second at least one capacitor 503 are configured to receive the third DC voltage, to build up a bias voltage, and to operate the second at least one electronic switch 509, turning "on" or "off" an electric current flowing from the second ground reference 255 to the first ground reference 254. In other words, when the input AC voltage is from a ballast, the LED driving circuit 401 operates whereas the at least one switch control module 501 provides a return current path from the LED driving circuit 401 to reach the ballast, thereby operating the one or more LED arrays 214. In FIG. 5, the second at least one electronic switch 509 comprises a metal-oxide-semiconductor field-effect transistor (MOSFET) or a transistor.

Figure 6:
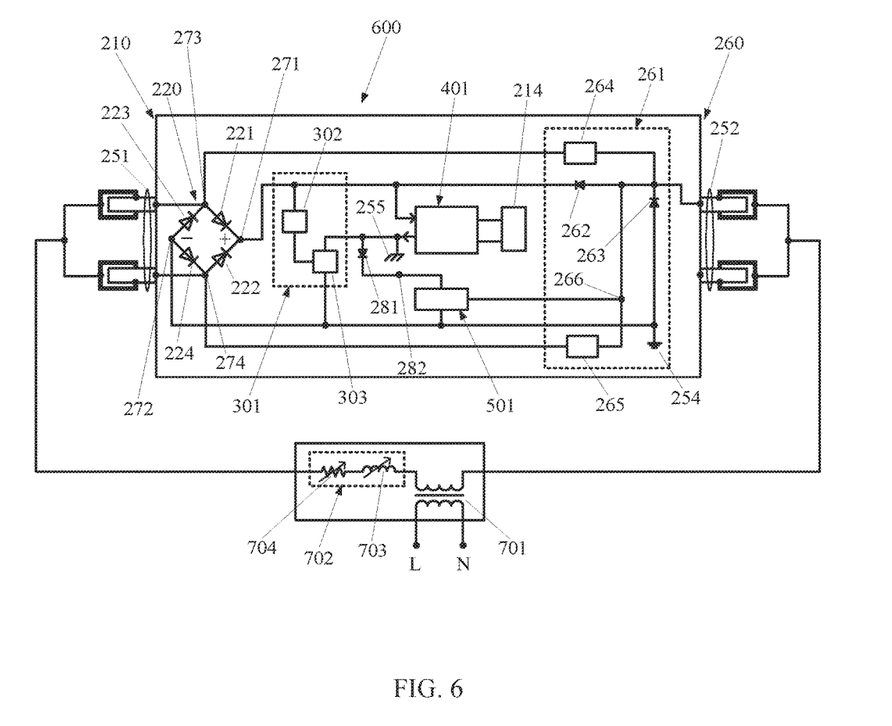
FIG. 6 is a block diagram of a linear LED lamp connected with a reference ballast in the double ends according to the present disclosure.

FIG. 6 is a block diagram of a linear LED lamp connected with a reference ballast in the double ends for testing electric shock according to the present disclosure. In FIG. 6, all the components and configurations are the same as those in FIG. 3, except that the ballast in FIG. 3 is replaced by a reference ballast 702 and an isolating transformer 701. The isolating transformer 701 is configured to isolate the line voltage from the AC mains (L and N) that connects to a branch circuit whereas the reference ballast 702 is a low frequency ballast that mimics a magnetic ballast. The reference ballast 702 comprises a variable inductor 703 and a variable resistor 704 and is used to test if the linear LED lamp 600 can pass an industry required electric shock current test. When used to test the electric shock current appeared at the first bi-pin 251 or the second bi-pin 252, the input AC voltage from the reference ballast 702 is electrically coupled to two of the four front-end diodes 221, 222, 223, and 224 and the two rear-end diodes 262 and 263 with a return current prevented from flowing through the at least one switch control module 501, but instead, allowed flowing in the anti-electric-shock module 301 to be blocked when electric shock current is detected, thereby passing such an industry required electric shock test.

In view of the above, select features of various embodiments in accordance with the present disclosure are highlighted below.

In one aspect, an LED lamp may include a front end and a rear end, one or more LED arrays with a forward voltage across thereon, a first bi-pin and a second bi-pin, an anti-electric-shock module, a front-end module and a rear-end module, an LED driving circuit, and at least one switch control module. The first bi-pin and the second bi-pin may be respectively coupled to the front end and the rear end, with each of the first bi-pin and the second bi-pin protruding outwards to receive an input AC voltage. The anti-electric-shock module may include a first ground reference, the anti-electric-shock module configured to detect an electric shock and to prevent a shock current, if occurred, from flowing into either the first bi-pin or the second bi-pin when the input AC voltage is a line voltage from AC mains. The front-end module may include four front-end diodes and may be coupled to the first bi-pin and the first ground reference. The rear-end module may include two rear-end diodes, coupled to the second bi-pin, and two voltage reduction circuits coupled between the first bi-pin and the second bi-pin. The four front-end diodes and the two rear-end diodes may be configured to manage electric current flows and to convert the input AC voltage into a first DC voltage. The LED driving circuit may include a second ground reference, an input filter, a PFC and control device, a first at least one electronic switch controlled by the PFC and control device, a current sensing resistor, a diode, a transformer with current charging and discharging thereof controlled by the first at least one electronic switch, a resistor, an output capacitor coupled in parallel with the resistor and connected to the transformer to build up a DC output voltage, and an alternate power unit. The LED driving circuit may be configured to receive and convert the first DC voltage into the DC output voltage greater than the forward voltage across the one or more LED arrays to operate thereon. The at least one switch control module may be coupled between the second ground reference and the first ground reference. The at least one switch control module may be configured to receive an AC signal voltage from the second bi-pin and to control the second ground reference to connect to the first ground reference when the input AC voltage is from a ballast.

In some embodiments, responsive to detecting zero current in the transformer within each AC cycle of the input AC voltage, the PFC and control device may generate control signals to turn the first at least one electronic switch "on" and "off", producing an LED current to drive the one or more LED arrays.

In some embodiments, when applied to the first bi-pin, the line voltage from the AC mains may be electrically coupled to the four front-end diodes.

In some embodiments, when applied across the first bi-pin and the second bi-pin, the line voltage from the AC mains may be electrically coupled to two of the four front-end diodes and the two rear-end diodes with the anti-electric-shock module operated to prevent a leakage current flowing into either the first bi-pin or the second bi-pin, whichever exposed to an installer.

In some embodiments, when applied across the first bi-pin and the second bi-pin, the input AC voltage from the ballast may be electrically coupled to two of the four front-end diodes and the two rear-end diodes with a first return current flowing through the at least one switch control module.

In some embodiments, when applied across the first bi-pin and the second bi-pin, an input AC voltage from a low-frequency reference ballast for testing the electric shock may be electrically coupled to two of the four front-end diodes and the two rear-end diodes with a second return current prevented from flowing through the at least one switch control module.

In some embodiments, the first at least one electronic switch may include a MOSFET or a transistor.

In some embodiments, the at least one switch control module may include a second at least one electronic switch, two diodes connected cathode-to-anode at a connection port, and a first at least one capacitor connected to the two diodes at the connection port. In such cases, the first at least one capacitor and the two diodes may be configured to rectify the AC signal voltage from the ballast into a third DC voltage.

In some embodiments, the second at least one electronic switch may include a MOSFET or a transistor.

In some embodiments, the at least one switch control module may further include a Zener diode, a resistor, and a second at least one capacitor connected in parallel with the Zener diode and the resistor. In such cases, the Zener diode, the resistor, and the second at least one capacitor may be configured to receive the third DC voltage, to build up a bias voltage, and to operate the second at least one electronic switch. Moreover, the second at least one electronic switch may be turned "on" or "off" to connect or disconnect the second ground reference with respect to the first ground reference.

In some embodiments, the anti-electric-shock module may further include a controller and a third at least one electronic switch. In such cases, the third at least one electronic switch may be configured to control an electric current flowing from the second ground reference to the first ground reference.

In some embodiments, the third at least one electronic switch may include a MOSFET or a transistor.

In some embodiments, the two voltage reduction circuits may respectively include a third at least one capacitor and a fourth at least one capacitor and may be configured to decrease the input AC voltage from the ballast and to reliably operate the LED driving circuit.

In some embodiments, the first at least one electronic switch may operate at a switching frequency greater than or equal to a frequency of the input AC voltage from the ballast to support switching in each AC cycle and to regulate an LED driving current when the input AC voltage is from the ballast.

In some embodiments, the transformer may include a primary winding and a secondary winding in a reversed polarity of the primary winding. Additionally, the primary winding may be coupled between the one or more LED arrays and the first at least one electronic switch. Moreover, the secondary winding may be coupled to the second ground reference. Furthermore, when the first at least one electronic switch is opened, a falling magnetic field in the primary winding may reverse a voltage polarity and cause a voltage across the secondary winding to be positive relative the second ground reference.

In some embodiments, the alternate power unit may include a voltage divider, at least one diode, and a resistor connected in series with the at least one diode. Additionally, the voltage divider may be connected in parallel with the secondary winding and configured to sample a proportion of the voltage across the secondary winding for PFC and control device to properly operate the LED driving circuit. Moreover, the at least one diode may be connected in series with the secondary winding and the voltage divider. Furthermore, the at least one diode and the resistor may be configured to draw partial power from the transformer to sustain an operation of the PFC and control device, subsequently operating the LED driving circuit.

Whereas preferred embodiments of the present disclosure have been shown and described, it will be realized that alterations, modifications, and improvements may be made thereto without departing from the scope of the following claims. Another LED driving circuit with an alternate power unit or another electric current flow management in an LL lamp using various kinds of combinations to accomplish the same or different objectives could be easily adapted for use from the present disclosure. Accordingly, the foregoing descriptions and attached drawings are by way of example only and are not intended to be limiting.

What is claimed is:

1. A linear light-emitting diode (LED) lamp, comprising:
  a front end and a rear end;
  one or more LED arrays with a forward voltage across thereon;

a first bi-pin and a second bi-pin respectively coupled to the front end and the rear end, each of the first bi-pin and the second bi-pin protruding outwards to receive an input alternating current (AC) voltage;

an anti-electric-shock module comprising a first ground reference, the anti-electric-shock module configured to detect an electric shock and to prevent a shock current, if occurred, from flowing into either the first bi-pin or the second bi-pin when the input AC voltage is a line voltage from AC mains;

a front-end module and a rear-end module, wherein the front-end module comprises four front-end diodes and is coupled to the first bi-pin and the first ground reference, wherein the rear-end module comprises two rear-end diodes, coupled to the second bi-pin, and two voltage reduction circuits coupled between the first bi-pin and the second bi-pin, and wherein the four front-end diodes and the two rear-end diodes are configured to manage electric current flows and to convert the input AC voltage into a first direct current (DC) voltage;

an LED driving circuit, wherein the LED driving circuit comprises a second ground reference, an input filter, a power factor correction (PFC) and control device, a first at least one electronic switch controlled by the PFC and control device, a current sensing resistor, a diode, a transformer with current charging and discharging thereof controlled by the first at least one electronic switch, a resistor, an output capacitor coupled in parallel with the resistor and connected to the transformer to build up a DC output voltage, and an alternate power unit, and wherein the LED driving circuit is configured to receive and convert the first DC voltage into the DC output voltage greater than the forward voltage across the one or more LED arrays to operate thereon; and at least one switch control module coupled between the second ground reference and the first ground reference, the at least one switch control module configured to receive an AC signal voltage from the second bi-pin and to control the second ground reference to connect to the first ground reference when the input AC voltage is from a ballast, wherein, responsive to detecting zero current in the transformer within each AC cycle of the input AC voltage, the PFC and control device generates control signals to turn the first at least one electronic switch "on" and "off", producing an LED current to drive the one or more LED arrays;

wherein, when applied to the first bi-pin, the line voltage from the AC mains is electrically coupled to the four front-end diodes;

wherein, when applied across the first bi-pin and the second bi-pin, the line voltage from the AC mains is electrically coupled to two of the four front-end diodes and the two rear-end diodes with the anti-electric-shock module operated to prevent a leakage current flowing into either the first bi-pin or the second bi-pin, whichever exposed to an installer;

wherein, when applied across the first bi-pin and the second bi-pin, the input AC voltage from the ballast is electrically coupled to two of the four front-end diodes and the two rear-end diodes with a first return current flowing through the at least one switch control module; and wherein, when applied across the first bi-pin and the second bi-pin, an input AC voltage from a low-frequency reference ballast for testing the electric shock is electrically coupled to two of the four front-end diodes and the two rear-end diodes with a second return current prevented from flowing through the at least one switch control module.

2. The linear LED lamp of claim 1, wherein the first at least one electronic switch comprises a metal-oxide-semiconductor field-effect transistor (MOSFET) or a transistor.

3. The linear LED lamp of claim 1, wherein the at least one switch control module comprises a second at least one electronic switch, two diodes connected cathode-to-anode at a connection port, and a first at least one capacitor connected to the two diodes at the connection port, and wherein the first at least one capacitor and the two diodes are configured to rectify the AC signal voltage from the ballast into a third DC voltage.

4. The linear LED lamp of claim 3, wherein the second at least one electronic switch comprises a metal-oxide-semiconductor field-effect transistor (MOSFET) or a transistor.

5. The linear LED lamp of claim 3, wherein the at least one switch control module further comprises a Zener diode, a resistor, and a second at least one capacitor connected in parallel with the Zener diode and the resistor, wherein the Zener diode, the resistor, and the second at least one capacitor are configured to receive the third DC voltage, to build up a bias voltage, and to operate the second at least one electronic switch, and wherein the second at least one electronic switch is turned "on" or "off" to connect or disconnect the second ground reference with respect to the first ground reference.

6. The linear LED lamp of claim 1, wherein the anti-electric-shock module further comprises a controller and a third at least one electronic switch, and wherein the third at least one electronic switch is configured to control an electric current flowing from the second ground reference to the first ground reference.

7. The linear LED lamp of claim 6, wherein the third at least one electronic switch comprises a metal-oxide-semiconductor field-effect transistor (MOSFET) or a transistor.

8. The linear LED lamp of claim 1, wherein the two voltage reduction circuits respectively comprise a third at least one capacitor and a fourth at least one capacitor and are configured to decrease the input AC voltage from the ballast and to reliably operate the LED driving circuit.

9. The linear LED lamp of claim 1, wherein the first at least one electronic switch operates at a switching frequency greater than or equal to a frequency of the input AC voltage from the ballast to support switching in each AC cycle and to regulate an LED driving current when the input AC voltage is from the ballast.

10. The linear LED lamp of claim 1, wherein the transformer comprises a primary winding and a secondary winding in a reversed polarity of the primary winding, wherein the primary winding is coupled between the one or more LED arrays and the first at least one electronic switch, wherein the secondary winding is coupled to the second ground reference, and wherein when the first at least one electronic switch is opened, a falling magnetic field in the primary winding reverses a voltage polarity and causes a voltage across the secondary winding to be positive relative the second ground reference.

11. The linear LED lamp of claim 10, wherein the alternate power unit comprises a voltage divider, at least one diode, and a resistor connected in series with the at least one diode, wherein the voltage divider is connected in parallel with the secondary winding and configured to sample a proportion of the voltage across the secondary winding for PFC and control device to properly operate the LED driving circuit, wherein the at least one diode is connected in series with the secondary winding and the voltage divider, and wherein the at least one diode and the resistor are configured to draw partial power from the transformer to sustain an operation of the PFC and control device, subsequently operating the LED driving circuit.

* * * * *